United States Patent
Nakajima (10) Patent No.: US 9,742,943 B2
(45) Date of Patent: Aug. 22, 2017

(54) IMAGE FORMING APPARATUS

(71) Applicant: Oki Data Corporation, Tokyo (JP)

(72) Inventor: Toru Nakajima, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1 day.

(21) Appl. No.: 15/044,184

(22) Filed: Feb. 16, 2016

(65) Prior Publication Data

US 2016/0316084 A1    Oct. 27, 2016

(30) Foreign Application Priority Data

Apr. 27, 2015 (JP) ................................. 2015-090754

(51) Int. Cl.
G03G 15/00 (2006.01)
H04N 1/00 (2006.01)
G03G 21/16 (2006.01)

(52) U.S. Cl.
CPC ..... *H04N 1/00559* (2013.01); *G03G 21/1628* (2013.01); *H04N 1/00554* (2013.01); *G03G 15/60* (2013.01); *G03G 21/1633* (2013.01); *H04N 2201/0094* (2013.01)

(58) Field of Classification Search
CPC .......... G03G 21/1647; G03G 21/1633; G03G 21/1623; G03G 21/1619; G03G 21/16; H04N 1/00554; H04N 1/00559
USPC ........................................ 399/110, 117, 125
See application file for complete search history.

(56) References Cited

U.S. PATENT DOCUMENTS

| 4,555,173 | A | * | 11/1985 | Iseki | G03G 15/6502 |
| | | | | | 399/125 |
| 5,206,681 | A | * | 4/1993 | Otomo | G03G 21/1628 |
| | | | | | 399/125 |
| 5,379,092 | A | * | 1/1995 | Takashima | G03G 21/1628 |
| | | | | | 312/324 |
| 7,133,626 | B2 | * | 11/2006 | Kaiga | G03G 7/00 |
| | | | | | 399/110 |
| 2012/0080987 | A1 | * | 4/2012 | Takamori | E05F 5/02 |
| | | | | | 312/327 |

FOREIGN PATENT DOCUMENTS

JP     2007079212 A    3/2007

* cited by examiner

*Primary Examiner* — Walter L Lindsay, Jr.
*Assistant Examiner* — Jessica L Eley
(74) *Attorney, Agent, or Firm* — Panitch Schwarze Belisario & Nadel LLP (57) ABSTRACT

An image forming apparatus includes an opening closing unit openably arranged between first and second positions and an associating mechanism connecting a body unit with the opening closing unit and operating in association with the opening closing unit. The associating mechanism includes plural compression springs and a buffer member, urges the opening closing unit with a first compression spring among the plural compression springs when the opening closing unit is placed at the first position, urges the opening closing unit with the first compression spring and a second compression spring when the opening closing unit is placed at a third portion between the first portion and the second position, and buffers the motion of the opening closing unit with the buffer member when the opening closing unit is placed at a fourth position between the second position and the third position.

15 Claims, 9 Drawing Sheets

FIG.11

IMAGE FORMING APPARATUS

CROSS REFERENCE TO RELATED APPLICATION

This application claims priority benefits under 35 USC, section 119 on the basis of Japanese Patent Application No. 2015-090754, the disclosure of which is incorporated herein by reference.

BACKGROUND OF THE INVENTION

This invention relates to an image forming apparatus.

DESCRIPTION OF RELATED ART

With conventional image forming apparatuses such as printers, photocopiers, facsimile machines, and MFPs, for example an MFP has a scanner unit serving as an opening closing unit, which is arranged swingably via a hinge to the printer section as the body unit, or namely, supported in an openable manner (for example, see Japanese Patent Application Publication No. 2007-79212 (A1)).

Such a conventional MFP may be suffered from reduced controllability at a time that the scanner unit is open and closed, as the scanner is made in a larger size

BRIEF SUMMARY OF THE INVENTION

It is therefore an object of the invention to provide an image forming apparatus with improved controllability at a time that an opening closing unit is open and closed, in solving the problems of the conventional MFPs.

An image forming apparatus according to one aspect of the invention, includes an opening closing unit arranged in an openable manner between a first position and a second position with respect to a body unit; and an associating mechanism connecting the body unit with the opening closing unit and operating in association with opening and closing of the opening closing unit, wherein the associating mechanism includes plural compression springs and a buffer member, urges the opening closing unit with a first compression spring among the plural compression springs when the opening closing unit is placed at the first position, urges the opening closing unit with the first compression spring and a second compression spring when the opening closing unit is placed at a third portion between the first portion and the second position, and buffers the motion of the opening closing unit with the buffer member when the opening closing unit is placed at a fourth position between the second position and the third position.

These and other objects, features, aspects and advantages of the disclosed disc brake caliper will become apparent to those skilled in the art from the following detailed description, which, taken in conjunction with the annexed drawings, discloses preferred embodiments.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Hereinafter, referring to the drawings, an image forming apparatus according to an embodiment of the invention are described in detail. In this description, an MFP is exemplified as the image forming apparatus of the invention.

Figure 2:
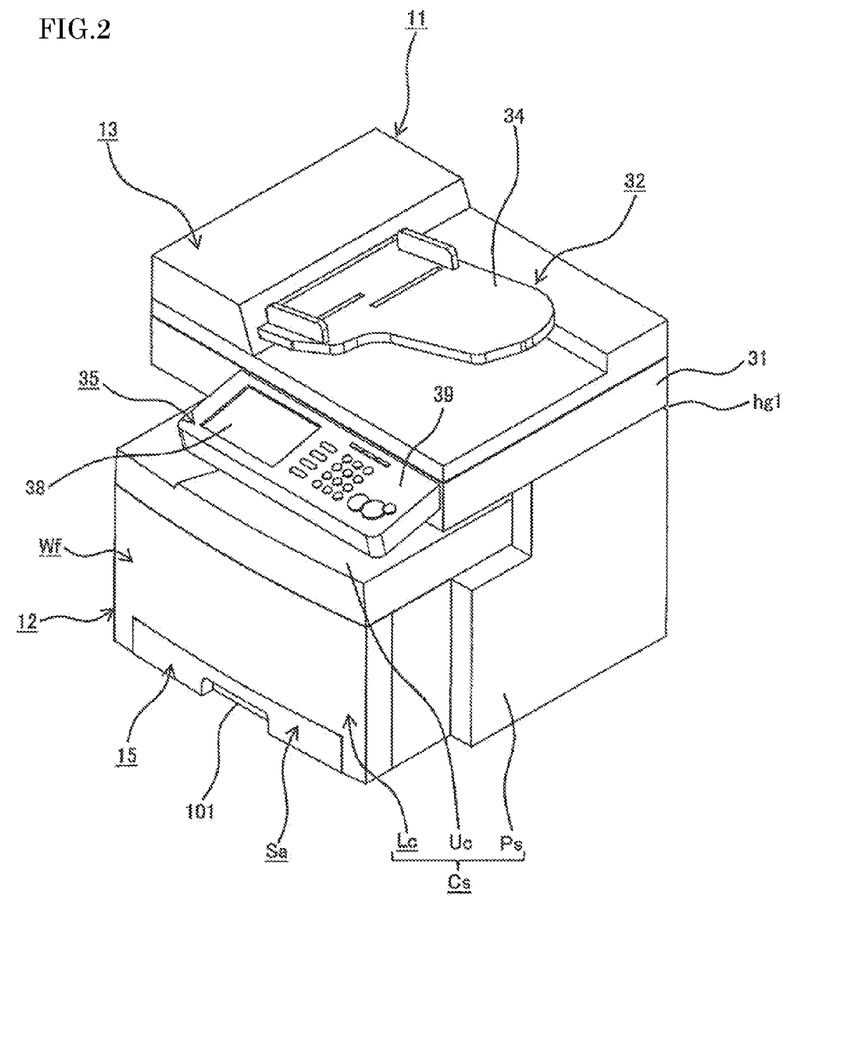
FIG. 2 is a perspective view showing an MFP according to the embodiment of the invention.
Figure 3:
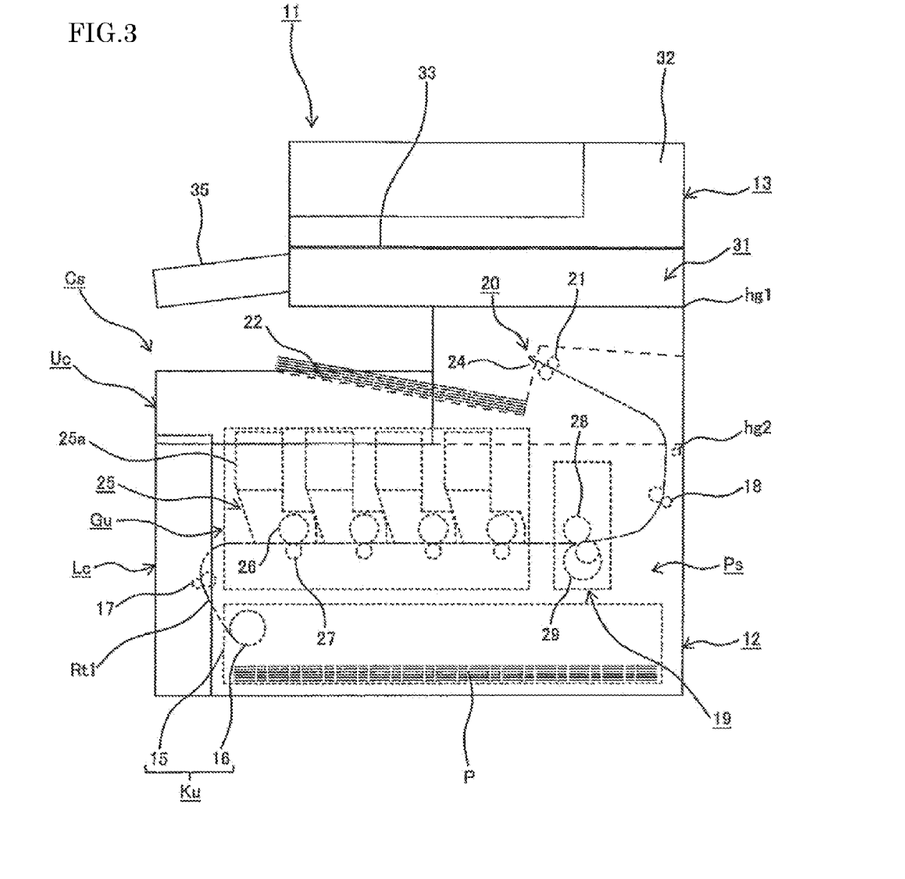
FIG. 3 is a schematic view showing the MFP according to the embodiment of the invention.

FIG. 2 is a perspective view showing an MFP according to the embodiment of the invention; FIG. 3 is a schematic view showing the MFP according to the embodiment of the invention.

In FIG. 2 and FIG. 3, an MFP 11 has a printer section 12 serving as a body unit of the MFP 11, and a scanner unit 13 is provided in a swingable manner with respect to the printer section 12 via a hinge hg1 as a first support mechanism, or namely, provided as an opening closing unit arranged in an openable manner.

The printer section 12 has a housing Cs, which includes a lower casing Lc, an upper cover Uc arranged swingably via a hinge hg2 as a second support mechanism with respect to the lower casing Lc or namely arranged in an openable manner, and a side plate Ps arranged adjacently to the lower casing Lc on the double sides of the lower casing Lc as projecting upwardly from the lower casing Lc structuring side walls of the housing Cs.

The printer section 12 has, in the body of the printer section 12, or namely at a lower portion of the apparatus body, a paper feeding device Ku including a paper cassette 15 serving as a medium container for containing the paper P as the media, and a feeding roller 16 for feeding the paper P in the paper cassette 15 to the medium conveyance route Rt1. The paper cassette 15 is disposed in a way that a front end surface Sa faces a front panel Wf of the lower casing Lc, and a handle 101 is formed at the front end surface Sa so that an operator can pull the paper cassette 15 forward by his hand.

The medium conveyance route Rt1 is extended with curves, and along the conveyance direction of the paper P, disposed are a first conveyance roller pair 17 for conveying the fed paper P on a downstream side of the feeding roller 16, an image forming section Gu for forming toner images as multicolor developed images on a downstream side of the first conveyance roller pair 17, a fixing device 19 serving as a fixing unit forming multicolor images upon fixing multicolor toner images to the paper P on a downstream side of the image forming section Gu, a second roller pair 18 conveying the paper P formed with multicolor images on a downstream side of the fixing device 19, and a paper delivery unit 20 serving as a medium delivery unit for delivering the paper P to an exterior of the apparatus body on a downstream side of the second conveyance roller pair 18.

The image forming section Gu includes such as, e.g., image forming units 25 of respective colors, yellow, magenta, cyan, and black disposed along the medium conveyance route Rt1, photosensitive drums 26 serving as image carriers provided respectively in the image forming units 25, LED heads, not shown, disposed facing the photosensitive drums 26, serving as exposure devices forming electrostatic latent images as latent images by exposing the photosensitive drums 26, developing devices, not shown, disposed respectively in the image forming units 25, serving as developing devices forming toner images from developing the electrostatic latent images, and transfer rollers 27 disposed facing the photosensitive drums 26 at a lower side of the respective image forming units 25, transferring the toner images formed on the photosensitive drums 26 to the paper P in a sequentially overlapping manner, serving as a transfer member for forming multicolor toner images. Toner cartridges 25a are provided for containing toner as developer.

The fixing device 19 includes a heating roller 28 serving as a first fixing member heating and melting the toner images on the paper P, and a pressure roller 29 serving as a second fixing member pressing the melting toner images to the paper P.

The paper delivery unit 20 has a delivery roller pair 21, and the paper P conveyed along the medium conveyance route Rt1 is delivered by the delivery roller pair 21 to a stacker 24 as a medium stacking section out of a delivery outlet 24 formed at the upper cover Uc.

The scanner unit 13 includes a flatbed portion 31 as an image reading section, and an automatic document feeder 32 as a document feeder disposed above the flatbed portion 31 in an operable manner with respect to the flatbed portion 31. The flatbed portion 31 includes, e.g., an image sensor unit not shown as a reading unit, and an original document table 33 as a first original document placing table for placing original documents. The automatic document feeder 32 includes, e.g., an original document table 34 serving as a second original document placing table for placing original documents, and a pickup roller not shown feeding out the original document from the original document table 34.

The flatbed portion 31 is formed with a control panel 35 as projecting forward, and the control panel 35 includes a display portion 38 for notifying the operator of a variety of information, and a controller 39 for rendering the operator control.

Operation of the MFP 11 where the MFP 11 is used as a photocopier to read images on an original document with the scanner unit 13 and then to print the read images on the paper P at the printer section 12, is described next.

The operator sets the original document on the original document table 33 of the scanner unit 13, and manipulates the controller 39 of the control panel 35 to enter various settings such as, e.g., selection of copy number and size of the paper P, magnification of zooming in and out. When a start key is pushed, the image sensor unit is moved to read the images on the original document, and the image data are transmitted to the printer section 12.

At the printer section 12, the image data sent from the scanner unit 13 are processed at a printer controller, not shown; signals of respective colors are sent to the LED heads; electrostatic latent images are formed upon exposure of the photosensitive drums 26 of the respective image forming units 25; the developing devices develop toner images from the electrostatic latent images.

To the contrary, the paper P fed into the medium conveyance route Rt1 out of the paper cassette 15 is conveyed with the first conveyance roller pair 17 and sent to the image forming section Gu; the toner images of the respective colors are transferred onto the paper P at the image forming section Gu to form the multicolor toner images. The paper P is then sent to the fixing device 19 to fix the multicolor toner images to the paper P at the fixing device 19, thereby forming multicolor images.

The paper P formed with the multicolor images are conveyed by the second conveyance roller pair 18 and delivered to the stacker 22 out of the delivery outlet 24 by the delivery roller pair 21.

In a case where paper jams occur in the printer section 12 or where the toner cartridge 25a is replaced since the toner cartridge 25a has no toner, the operator moves pivotally the scanner unit 13 around the hinge hg1 as a center to open the unit 13, and moves pivotally the upper cover Uc around the hinge hg2 as a center to open the cover Uc. After removing the jammed paper P or replacing the toner cartridge 25a, the upper cover Uc is closed, and then, the scanner unit 13 is closed.

The upper cover Uc, however, is no more than covering the lower casing Lc, and because of a light weight, the upper cover Uc may not provide any impact to the MFP 11 when opening and closing. To the contrary, the scanner unit 13 has such as the flatbed portion 31 and the automatic document feeder 32 and is heavy, so that urging force may be produced when opening and closing the scanner unit 13, thereby providing an impact on the MFP 11 at the end of opening and closing operation.

In this embodiment, to prevent the MFP 11 from receiving impacts according to opening and closing of the scanner unit 13, a scanner support unit 40 is arranged as a support unit as well as an associating mechanism connecting between the printer section 12 and the scanner unit 13. The scanner support unit 40 is disposed as to connect the printer section 12 and the scanner unit 13 on the double sides of the MFP 11, and operates in association with opening and closing operation of the scanner unit 13.

Figure 1:
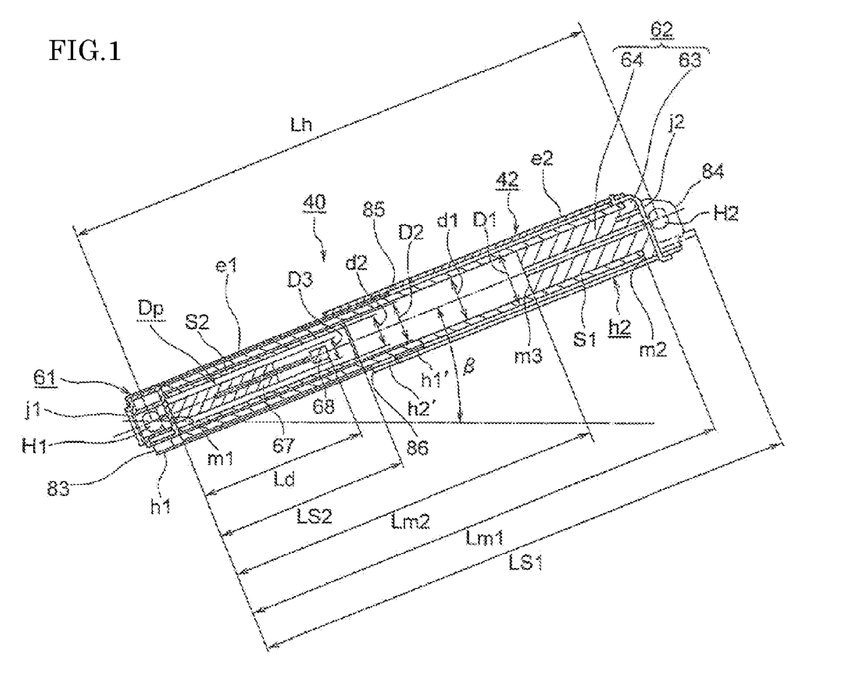
FIG. 1 is a vertical cross section showing a scanner support unit according to an embodiment of the invention.
Figure 4:
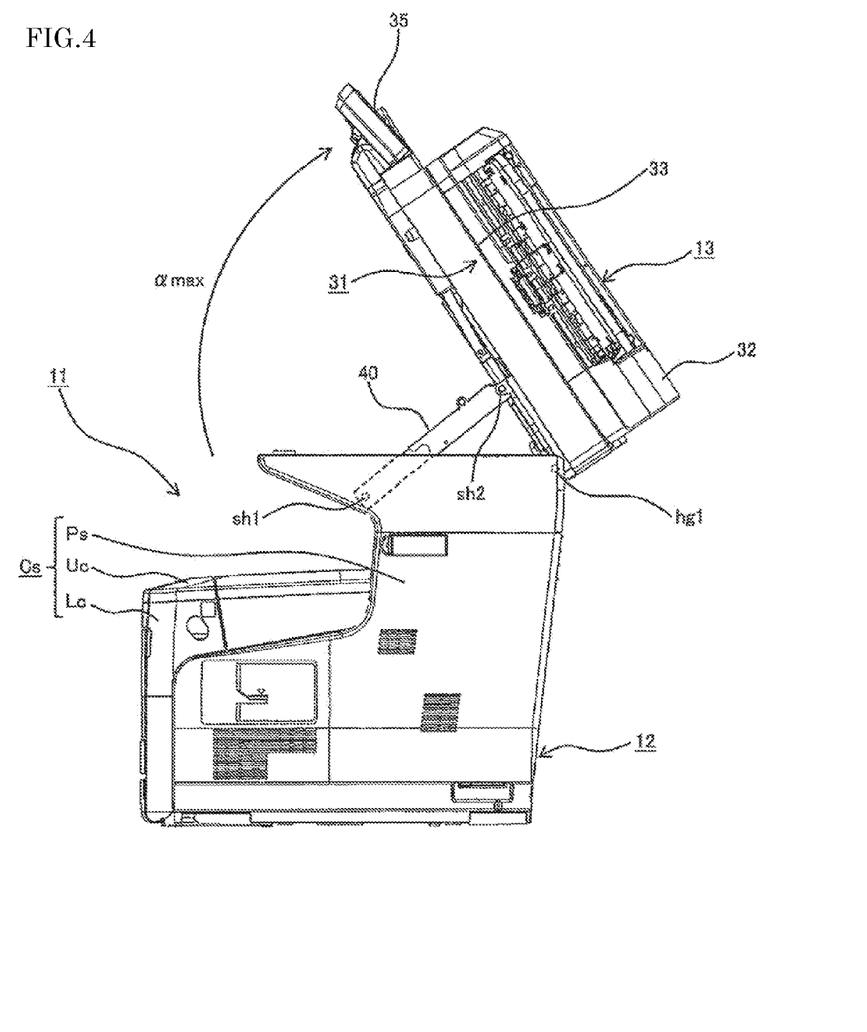
FIG. 4 is a side view showing the MFP in a state that the scanner unit is open according to the embodiment of the invention.
Figure 5:
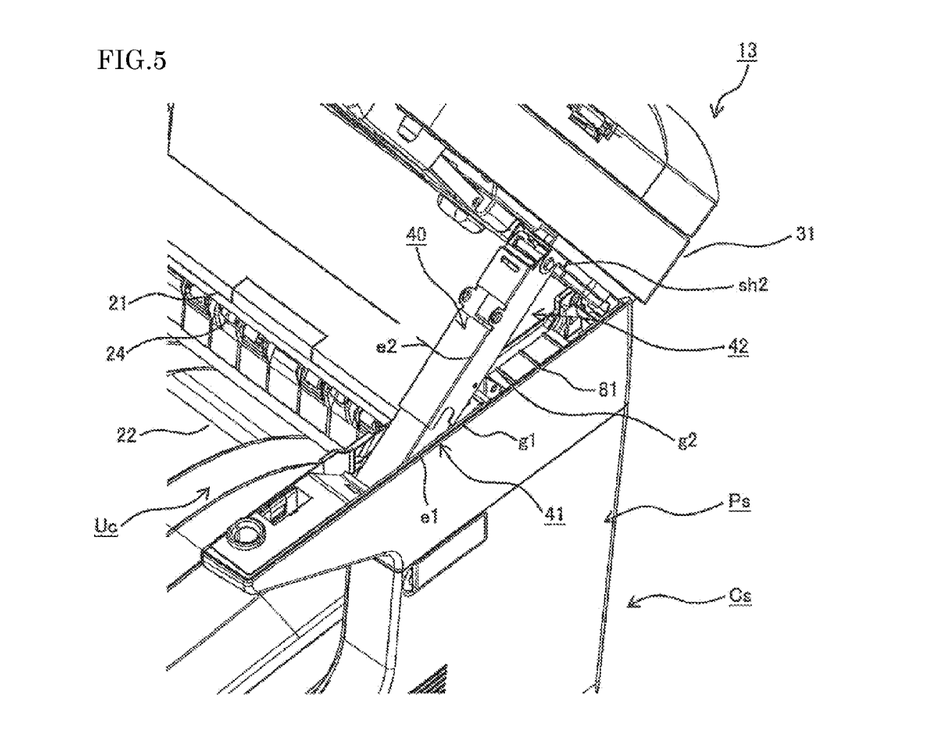
FIG. 5 is an essential perspective view showing an essential portion of the MFP in the state that the scanner unit is open according to the embodiment of the invention.
Figure 6:
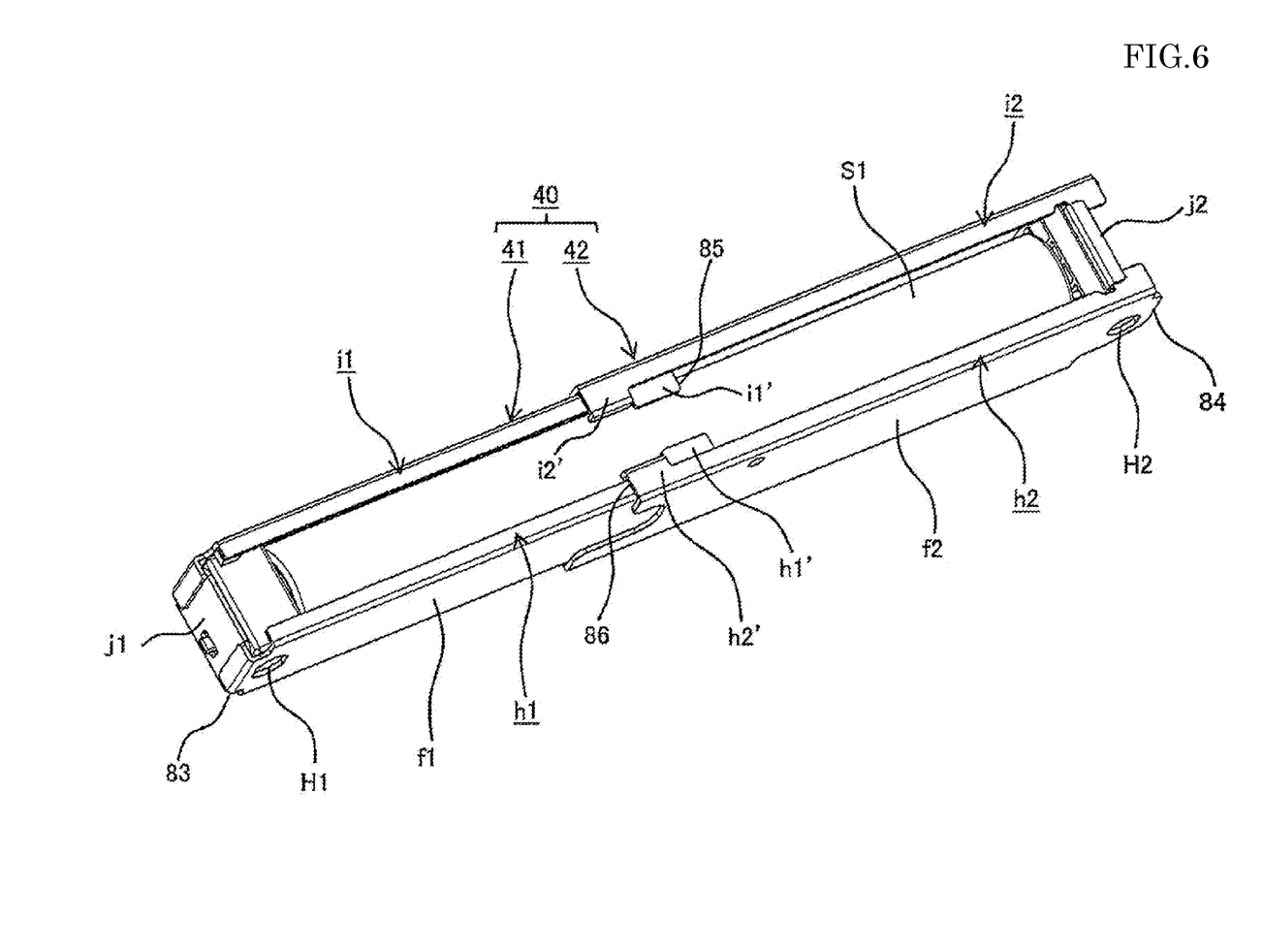
FIG. 6 is a perspective view showing the scanner support unit when viewed from a bottom side according to the embodiment of the invention.
Figure 7:
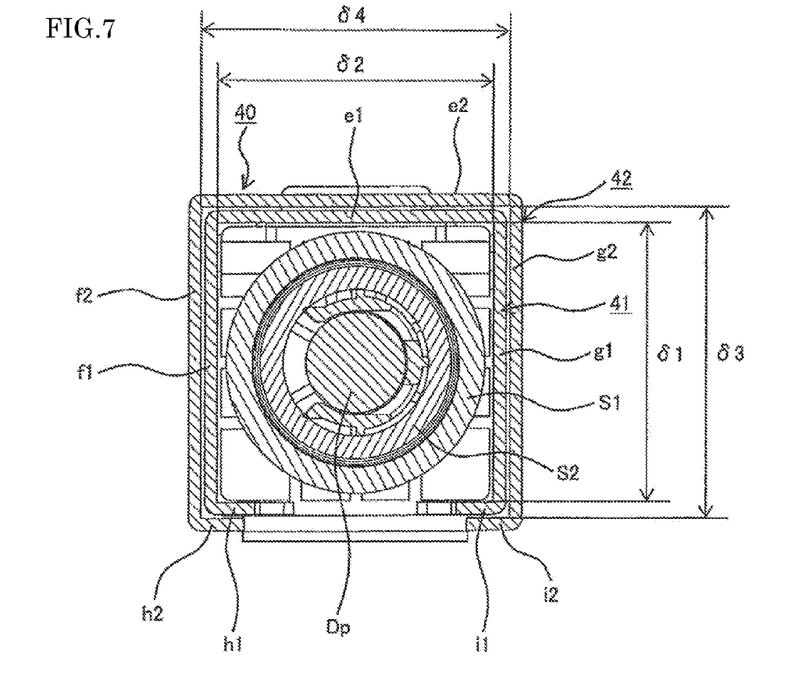
FIG. 7 is a lateral cross section showing the scanner support unit according to the embodiment of the invention.

FIG. 1 is a vertical cross section showing a scanner support unit according to an embodiment of the invention; FIG. 4 is a side view showing the MFP in a state that the scanner unit is open according to the embodiment of the invention; FIG. 5 is an essential perspective view showing an essential portion of the MFP in the state that the scanner unit is open according to the embodiment of the invention; FIG. 6 is a perspective view showing the scanner support unit when viewed from a bottom side according to the embodiment of the invention; FIG. 7 is a lateral cross section showing the scanner support unit according to the embodiment of the invention.

In FIG. 4, the MFP 11 includes the printer section 12, the scanner unit 13, the housing Cs of the printer section 12, the lower casing Lc, the upper cover Uc, the side plate Ps, the hinge hg1, the flatbed portion 31, the automatic document feeder 32, the original document table 33, and the scanner support unit 40. It is to be noted that, where an angle of the lower surface of the scanner unit 13 or the upper surface of the original document table 33 with respect to the horizontal surface is set to an open angle α of the scanner unit 13, FIG. 4 illustrates a state that the scanner unit 13 is open up to the maximum value αmax of the open angle α, or 56 (fifty six) degrees, in this embodiment.

The scanner support unit 40 is compressed as changing an inclined angle β with respect to the horizontal surface according to opening and closing of the scanner unit 13, connects the printer section 12 with the scanner unit 13, and supports the scanner unit 13. An end of the scanner support unit 40 on a side near the printer section 12 is supported swingably around a prescribed portion of the side plate Ps, or namely around a support shaft sh1 disposed on a further front side of the delivery outlet 24, whereas an end of the scanner support unit 40 on a side near the scanner unit 13 is supported swingably around a prescribed portion of a lower surface of the scanner unit 13, or namely around a support shaft sh2 disposed adjacent to the hinge hg1 with a prescribed distance away from the hinge hg1.

It is to be noted that the scanner support unit 40 is inclined as having the inclined angle β of a prescribed value with respect to the horizontal surface, or the angle of 16 (sixteen) degrees in this embodiment, in a state that the scanner unit 13 is closed, and at that time, the scanner support unit 40 is contained in a container 81 formed in the side plate Ps as opening the top surface.

The scanner support unit 40 includes an inner casing 41 as a first casing, and an outer casing 42 as a second casing enveloping the inner casing 41 disposed movable and slidable with respect to the inner casing 41. The scanner support unit 40 is formed with holes H1, H2 provided at one ends 83, 84 of the inner casing 41 and the outer casing 42; the support shafts sh1, sh2 are penetrated through the holes H1, H2, respectively, in a pivotal manner, thereby making the scanner support unit 40 supported swingably with respect to the printer section 12 and the scanner unit 13; the other end 85 of the inner casing 41 is compressed as in a state being inserted in the other end 86 of the outer casing 86. Each of the inner casing 41 and the outer casing 42 has a cross section extending in the longitudinal direction in a traversely square letter-U shape.

According to opening of the scanner unit 13, the inner casing 41 is pulled out from the outer casing 42 in a prescribed amount, and thereby the scanner support unit 40 is expanded. According to closing of the scanner unit 13, the inner casing 41 is pushed into the outer casing 42 in a prescribed amount, and thereby the scanner support unit 40 is compressed.

The inner casing 41 includes a top wall e1, side walls f1, g1 pending from opposite edges of the top wall e1, and projecting walls h1, i1 projecting from the lower ends of the side walls f1, g1 as facing each other. The outer casing 42 includes a top wall e2, side walls f2, g2 pending from opposite edges of the top wall e2, and projecting walls h2, i2 projecting from the lower ends of the side walls f2, g2 as facing each other. The inner casing 41 is contained in a manner movable and slidable with respect to the outer casing 42. In the inner casing 41 and the outer casing 42, a plurality of springs, or namely in this embodiment, springs S1, S2 as first and second urging members, and a damper Dp as a buffer member are arranged coaxially. In this embodiment, the springs S1, S2 operate as first and second compression springs.

The damper Dp includes a cylinder portion 67 as a first buffer element, and a piston portion 68 as a second buffer element disposed movably relatively to the cylinder portion 67, and the motion of the piston portion 68 is buffered from a fluid contained in the cylinder portion 67 for buffering, thereby making the motion of the scanner unit 13 buffered.

Engagement portions h1', i1' serving as first open angle limiting members are formed at the projecting walls h1, i1 at the end 85 of the inner casing 41, and engagement portions h2', i2' serving as second open angle limiting members are formed at the projecting walls h1, i1 at the end 86 of the outer casing 42. The engagement portions h1', i1' are formed from widening the widths of the projecting walls h1, i1, and the engagement portions h2', i2' are formed from widening the widths of the projecting walls h2, i2. The positions of the engagement portions h1', h2', i2' are set so that the open angle α of the scanner unit 14 becomes the maximum value αmax when the engagement portions h1', i1' and the engagement portions h2', i2' are engaged with each other. Accordingly, if the inner casing 41 is pulled out of the outer casing 42 in the preset maximum amount, the engagement portions h1', i1' and the engagement portions h2', i2' come to engage each other, thereby preventing the inner casing 41 from pulled out of the outer casing 42 further.

The hole H1 is formed at the side walls f1, g1 provided at the end 83 of the inner casing 41 to render the support shaft sh1 penetrate the end 83, and the hole H2 is formed at the side walls f2, g2 provided at the end 84 of the outer casing 42 to render the support shaft sh2 penetrate the end 84. Where a distance between the holes H1, H2 is denoted as Lh, the distance Lh takes the maximum valve Lhmax in a state that the scanner unit 13 is open and the minimum value Lhmin in a state that the scanner unit 13 is closed.

It is to be noted that the end 83 of the inner casing 41 is covered with an end wall j1 pending from the top wall e1, and the end 84 of the outer casing 42 is covered with an end wall j2 pending from the top wall e2.

Next, an arrangement state of the springs S1, S2 and the damper Dp is described.

In this situation, the spring S1 is disposed inside the inner casing 41 and the outer casing 42; the spring S2 is disposed on a radially inner side of the spring S1; and the damper Dp is disposed on a radially inner side of the spring S2. Accordingly, where a distance between the top wall e1 and the projecting walls h1, i1 of the inner casing 41 is denoted by δ1, where a distance between the side walls f1, g1 of the inner casing 41 is denoted by δ2, where a distance between the top wall e2 and the projecting walls h2, i2 of the outer casing 42 is denoted by δ3, where a distance between the side walls f2, g2 of the outer casing 42 is denoted by δ4, where the outer diameter of the spring S1 is denoted by D1, where the inner diameter of the spring S1 is denoted by d1, where the outer diameter of the spring S2 is denoted by D2, where the inner diameter of the spring S2 is denoted by d2, and where the maximum diameter of the damper Dp is denoted by D3, the following formulae are satisfied.

$D1 < \delta1 = \delta2 < \delta3 = \delta4$ $D2 < d1$ $D3 < d2$

A contact member 61 as a first engagement member is disposed adjacently to the end wall j1 in the inner casing 41.

The contact member 61 has a square pillar shape as to be contained in the inner casing 41, and is formed with a first engagement surface m1 for engaging and fixing the one ends of the springs S1, S2 and the damper Dp to the end surface on a side of the end 85.

A contact member 62 as a second engagement member is disposed adjacently to the end wall j2 in the outer casing 42. The contact member 62 includes a flange portion 63 as a first contact portion formed adjacently with the end wall j2, and a projecting portion 64 as a second contact portion formed projecting toward the side of the end 86 from the flange portion 63. The flange portion 63 has a rectangular shape contained in the outer casing 42, and the projecting portion 64 has a cylindrical shape contained in the spring S1. A second engagement surface m2 is formed at an end surface of the flange portion 63 on the side of the end 83 for engaging and contacting the other end of the spring S1, and a third engagement surface m3 is formed at an end surface of the projecting portion 64 on the side of the end 83 for engaging and contacting the other end of the spring S2 and the damper Dp.

Where the scanner unit 13 is open and where the distance Lh between the holes H1, H2 takes the maximum value Lhmax, the spring S1 is engaged with the first and second engagement surfaces m1, m2, and enters into a compressed state between the first and second engagement surfaces m1, m2. It is to be noted that where the distance between holes H1, H2 takes the maximum value Lhmax, the engagement portions h1', i1' and the engagement portions h2', i2 are engaged with each other, thereby keeping a state that the inner casing 41 is pulled out of the outer casing 42 in a prescribed amount. The spring S2 and the damper Dp at that time engage only the first engagement surface m1 and does not engage the third engagement surface m3.

That is, where the length of the spring S1 at a time of no load, or namely a free length is denoted by LS1, where the free length of the spring S2 is denoted by LS2, where the free length of the damper Dp is denoted by Ld, where the length between the first and second engagement surfaces m1, m2 when the length Lh between the holes H1, H2 takes the maximum value Lhmax, or namely the maximum length is denoted by Lm1, and where the maximum length between the first and third engagement surfaces m1, m3 is denoted by Lm2, the following formulae are satisfied.

$$Lm1<LS1$$

$$Lm2<Lm1$$

$$LS2<Lm2$$

$$Ld<LS2$$

Next, respective states of the scanner support unit 40 when the scanner unit 13 is open and closed are described.

Figure 8:
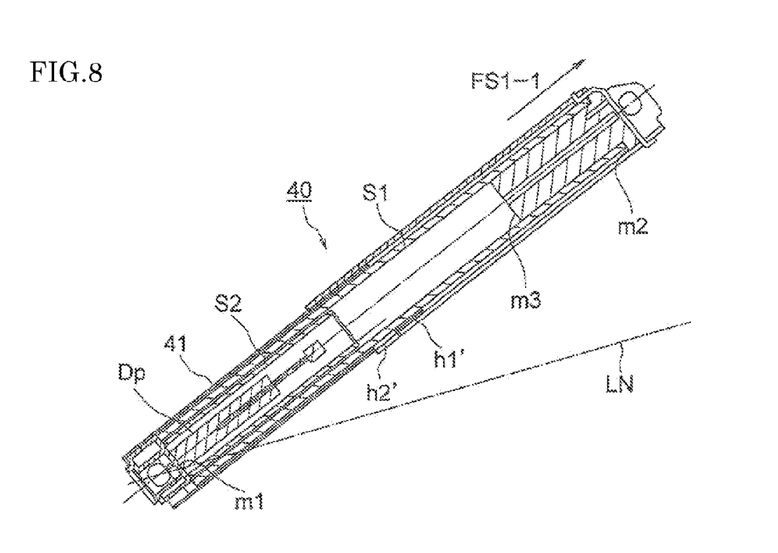
FIG. 8 is a view showing a first state of the scanner support unit according to the embodiment of the invention.
Figure 9:
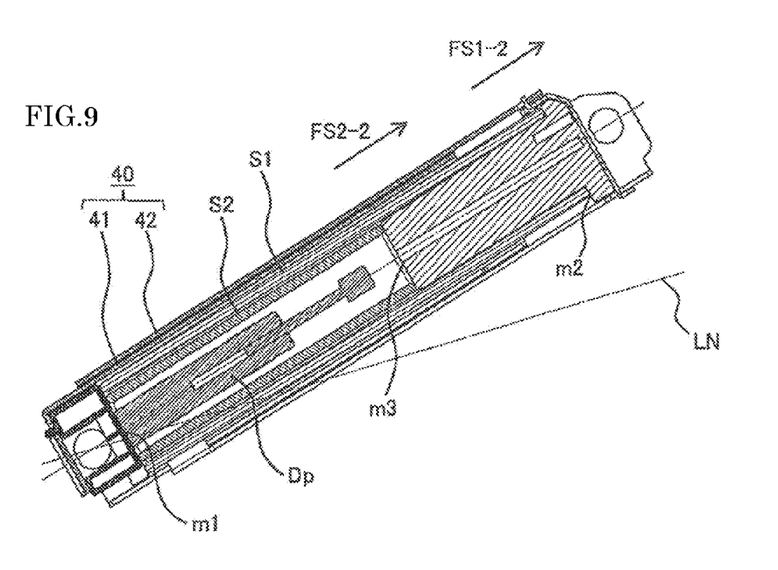
FIG. 9 is a view showing a second state of the scanner support unit according to the embodiment of the invention.
Figure 10:
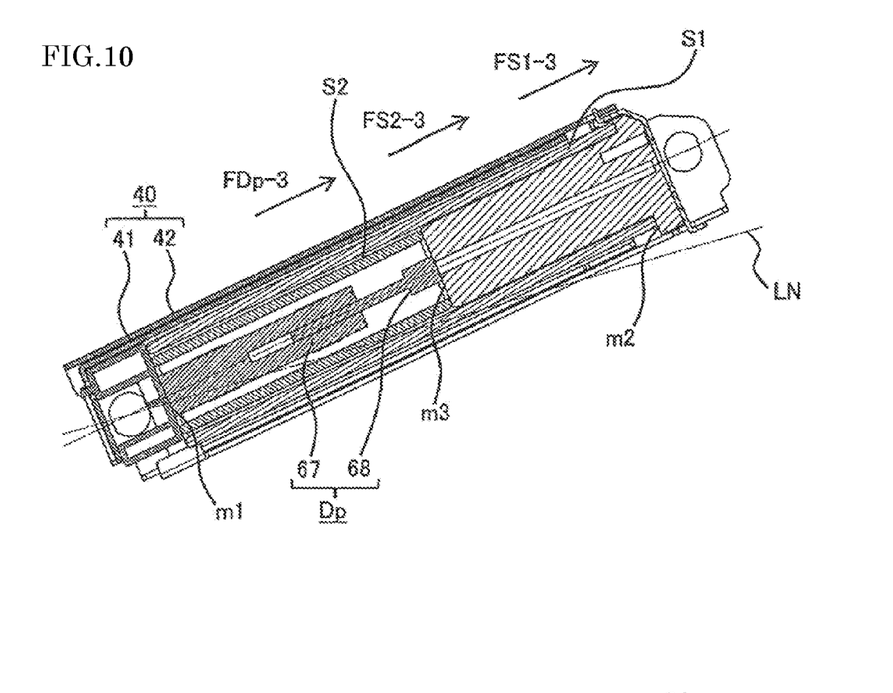
FIG. 10 is a view showing a third state of the scanner support unit according to the embodiment of the invention.
Figure 11:
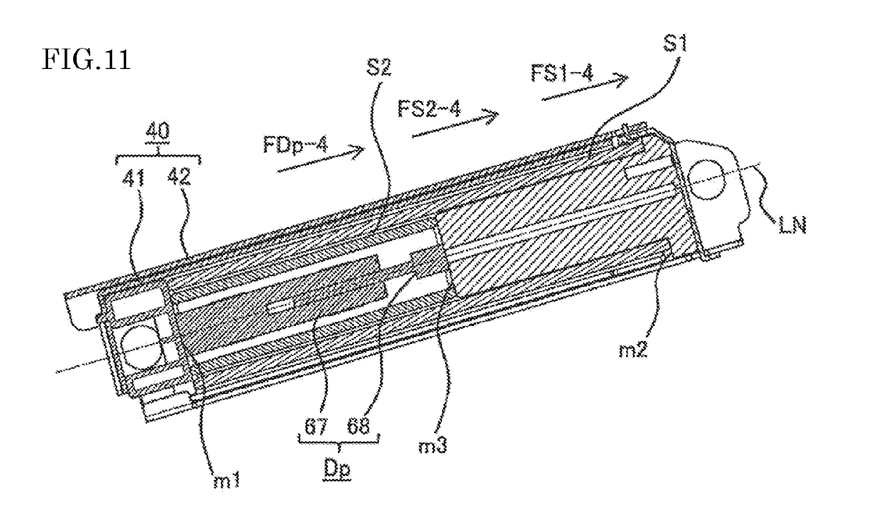
FIG. 11 is a view showing a fourth state of the scanner support unit according to the embodiment of the invention.

FIG. 8 is a view showing a first state of the scanner support unit according to the embodiment of the invention; FIG. 9 is a view showing a second state of the scanner support unit according to the embodiment of the invention; FIG. 10 is a view showing a third state of the scanner support unit according to the embodiment of the invention; and FIG. 11 is a view showing a fourth state of the scanner support unit according to the embodiment of the invention. It is to be noted that in FIGS. 8 to 11, a single dot chain line NL indicates a center line of the scanner support unit 40 when the inclined angle β takes the minimum value or namely 16 (sixteen) degrees.

In FIGS. 8 to 11, the scanner support unit 40 includes the inner casing 41, the outer casing 42, the springs S1, S2, and the damper Dp.

FIG. 8 shows a state of the scanner support unit 40 where the open angle α of the scanner unit 13 (see, FIG. 2) is set to the maximum value αmax or namely 56 (fifty six) degrees and the inclined angle β is set to 38 (thirty eight) degrees.

In this situation, the inner casing 41 is pulled out of the outer casing 42 in the maximum amount, and the engagement portions h1', i1' (see, FIG. 6) and the engagement portions h2', i2' are engaged with each other. The spring S1 engages the first and second engagement surfaces m1, m2 and enters in a compressed state between the first and second engagement surfaces m1, m2. The spring S2 and the damper Dp at that time do not engage the third engagement surface m3.

Accordingly, the spring S1 urges the outer casing 42 in a direction moving the outer casing 42 toward the scanner unit 13 with urging force FS1-1 according to the compressed amount of the spring S1 and urges the scanner unit 13 in a direction opening the scanner unit 13.

FIG. 9 shows a state of the scanner support unit 40 where the open angle α of the scanner unit 13 is set to 15 (fifteen) degrees and the inclined angle β is set to 28 (twenty eight) degrees.

In this situation, the inner casing 41 is pushed into the outer casing 42 in a prescribed amount. The spring S1 engages the first and second engagement surfaces m1, m2 and enters in a compressed state between the first and second engagement surfaces m1, m2. The spring S2 engages the first and third engagement surfaces m1, m3 and enters in a compressed state between the first and third engagement surfaces m1, m3. The damper Dp at that time does not engage the third engagement surface m3.

Accordingly, the spring S1 with urging force FS1-2 according to the compressed amount, and the spring S2 with urging force FS2-2 according to the compressed amount, urge the outer casing 42 in a direction moving the outer casing 42 toward the scanner unit 13 and urge the scanner unit 13 in a direction opening the scanner unit 13. It is to be noted that the urging force FS1-1 and the urging force FS1-2 satisfy the following formula.

$$FS1\text{-}1<FS1\text{-}2$$

FIG. 10 shows a state of the scanner support unit 40 where the open angle α of the scanner unit 13 is set to 5 (five) degrees and the inclined angle β is set to 20 (twenty) degrees.

The inner casing 41 at that time is further pushed into the outer casing 42. The spring S1 engages the first and second engagement surfaces m1, m2 and enters in a compressed state between the first and second engagement surfaces m1, m2. The spring S2 engages the first and third engagement surfaces m1, m3 and enters in a compressed state between the first and third engagement surfaces m1, m3. The damper Dp engages the first and third engagement surfaces m1, m3.

Accordingly, the spring S1 with urging force FS1-3 according to the compressed amount, and the spring S2 with urging force FS2-3 according to the compressed amount, urge the outer casing 42 in a direction moving the outer casing 42 toward the scanner unit 13 and urge the scanner unit 13 in a direction opening the scanner unit 13. It is to be noted that the urging force FS1-2 and the urging force FS1-3 satisfy the following formula.

$$FS1\text{-}2<FS1\text{-}3$$

The urging force FS2-2 and the urging force FS2-3 satisfy the following formula.

$$FS2\text{-}2 < FS\ 2\text{-}3$$

The damper Dp with urging force FDp-3 until that the fluid for buffering in the cylinder portion 67 reaches a steady state, urges the outer casing 42 in a direction moving the outer casing 42 toward the scanner unit 13 and urges the scanner unit 13 in a direction opening the scanner unit 13.

FIG. 11 shows a state of the scanner support unit 40 where the open angle α of the scanner unit 13 is set to 0 (zero) degree and the inclined angle β is set to 16 (sixteen) degrees, or namely where the scanner unit 13 is closed.

In this situation, the inner casing 41 is further pushed into the outer casing 42. The spring S1 engages the first and second engagement surfaces m1, m2 and enters in a compressed state between the first and second engagement surfaces m1, m2. The spring S2 engages the first and third engagement surfaces m1, m3 and enters in a compressed state between the first and third engagement surfaces m1, m3. The damper Dp engages the first and third engagement surfaces m1, m3.

Accordingly, the spring S1 with urging force FS1-4 according to the compressed amount, and the spring S2 with urging force FS2-4 according to the compressed amount, urge the outer casing 42 in a direction moving the outer casing 42 toward the scanner unit 13 and urge the scanner unit 13 in a direction opening the scanner unit 13. It is to be noted that the urging force FS1-3 and the urging force FS1-4 satisfy the following formula.

$$FS1\text{-}3 < FS\ 1\text{-}4$$

The urging force FS2-3 and the urging force FS2-4 satisfy the following formula.

$$FS2\text{-}3 < FS\ 2\text{-}4$$

The damper Dp with urging force FDp-4 until that the fluid for buffering in the cylinder portion 67 reaches a steady state, urges the outer casing 42 in a direction moving the outer casing 42 toward the scanner unit 13 and urges the scanner unit 13 in a direction opening the scanner unit 13.

The position of the scanner unit 13 when the open angle α is set to 56 (fifty six) degrees is set to the first position as the opening position; the position of the scanner unit 13 when the open angle α is set to 0 (zero) degree is set to the second position as the closing position; the position of the scanner unit 13 when the open angle α is set to 15 (fifteen) degrees is set to the third position; the position of the scanner unit 13 when the open angle α is set to 5 (five) degrees is set to the fourth position. Accordingly, the scanner unit 13 is disposed in an openable manner between the first and second positions; the scanner unit 13 moves from the first position via the fourth and third positions to the second position and is closed; and the scanner unit 13 moves from the second position via the fourth and third positions to the first position and is open.

The spring S1 is placed in a state normally compressed between the first and second positions to urge the scanner unit 13; where the scanner unit 13 is placed at the third position, the springs S1, S2 urge the scanner unit 13; where the scanner unit 13 is placed at the fourth position, the springs S1, S2 urge the scanner unit 13, and the damper Dp, or the buffer member, buffers the motion of the scanner unit 13; where the scanner unit 13 is placed at the second position, the springs S1, S2 urge the scanner unit 13.

Next, the operation of the scanner support unit 40 when the scanner unit 13 is open and closed is described.

As shown in FIG. 11, where the scanner unit 13 is closed and placed at the second position, the inclined angle β (see, FIG. 1) of the scanner support unit 40 is set to 16 (sixteen) degrees as the initial angle, and the open angle α of the scanner unit 13 is set to 0 (zero) degree, so that the springs S1, S2 urge the scanner unit 13 in a direction opening the scanner unit 13 with the urging forces FS1-4, FS2-4. The spring constants of the springs S1, S2 are set so that, when a moment generated in a direction opening the scanner unit 13 with the urging forces FS1-4, FS2-4 is compared with a moment generated in a direction closing the scanner unit 13 by the self-weight, the moment generated in the direction opening the scanner unit 13 is slightly smaller than the moment generated in the direction closing the scanner unit 13 by the self-weight. Accordingly the scanner unit 13 maintains the closed state as far as not receiving any external force.

With the printer section 12 (see, FIG. 2), in a case that a paper jamming occurs or that the toner cartridge 25a (see, FIG. 3) is replaced, if the operator grips the scanner unit 13 to exert his force in the opening direction, the moment generated in the direction opening the scanner unit 13 becomes larger than the moment generated in the direction closing the scanner unit 13 by the self-weight, so that the scanner unit 13 can be opened with slight force.

Subsequently, as shown in FIG. 10, where the scanner unit 13 is open and placed at the fourth position, the inclined angle β of the scanner support unit 40 becomes larger, and the open angle α of the scanner unit 13 is set to 5 (five) degrees, thereby making smaller the moment generated in the direction closing the scanner unit 13 by the self-weight. As shown in FIG. 9, if the scanner unit 13 is further open and placed at the third portion, the engagement between the spring S2 and the third engagement surface m3 is released, and only the spring S1 urges the scanner unit 13 in the direction opening the scanner unit 13 with the urging force FS1-4. With this operation, the moment generated in the direction opening the scanner unit 13 is made smaller.

As shown in FIG. 8, where the scanner unit 13 is further open and placed at the first position, the open angle α of the scanner unit 13 is set to 56 (fifty six) degrees, and the engagement portions h1', i1' and the engagement portions h2', i2' are engaged with each other, so that the scanner unit 13 is stopped in that state. The spring constant of the spring S1 is set so that, when the moment generated in the direction opening the scanner unit 13 with the urging force FS1-4 is compared with the moment generated in the direction closing the scanner unit 13 by the self-weight, the moment generated in the direction opening the scanner unit 13 is slightly larger than the moment generated in the direction closing the scanner unit 13 by the self-weight. Accordingly, the scanner unit 13 maintains the open state as far as not receiving any external force.

In this situation, when the scanner unit 13 is open, the scanner unit 13 may not be open vigorously, because the urging force urging the scanner unit 13 in the opening direction is made smaller, as the open angle α of the scanner unit 13 is made larger.

Subsequently, in a state shown in FIG. 8, if the operator grips the scanner unit 13 to exert his force in the closing direction, the moment generated in the direction opening the scanner unit 13 becomes smaller than the moment generated in the direction closing the scanner unit 13 by the self-weight, so that the scanner unit 13 can be closed with slight force.

As the inclined angle β of the scanner support unit 40 is made smaller and as the open angle α of the scanner unit 13 is made smaller, the moment generated in the direction closing the scanner unit 13 by the self-weight is made larger, and the spring S2 is engaged with the third engagement surface m3 as shown in FIG. 9, so that the springs S1, S2 urge the scanner unit 13 in the direction opening the scanner unit 13 with the urging force FS1-4. With this operation, the moment generated in the direction opening the scanner unit 13 is made larger.

Where the inclined angle β of the scanner support unit 40 is further made smaller, and as shown in FIG. 10, where the open angle α of the scanner unit 13 becomes 5 (five) degrees, the damper Dp engages the third engagement surface m3, thereby buffering the motion of the scanner unit 13.

In this situation, when the scanner unit 13 is closed, as the open angle α is made smaller, not only the urging force urging in the direction opening the scanner unit 13 is made larger, but also the motion of the scanner unit 13 is buffered by the damper Dp, so that the scanner unit 13 may not be closed vigorously.

According to the embodiment thus described, as the scanner support unit 40 includes the springs S1, S2 and the damper Dp, the spring S1 urges the scanner unit 13 when the scanner unit 13 is placed at the first portion, and the springs S1, S2 urge the scanner unit 13 with the urging forces FS1-2, FS2-2 when the scanner unit 13 is placed at the third position, so that the scanner unit 13 may not be open and closed vigorously. The damper Dp buffers the motion of the scanner unit 13 when the scanner unit 13 is placed at the fourth position, thereby surely preventing the scanner unit 13 from closing vigorously.

The MFP 11, therefore, does not receive any impact at the end of the opening and closing operation of the scanner unit 13, so that controllability at a time opening and closing the scanner unit 13 can be improved even where the scanner unit 13 is made in a larger size.

Because the scanner support unit 40 is formed inside with no more than the springs S1, S2 and the damper Dp, not only the support unit structure for supporting the scanner unit 13 can be simplified, but also the MFP 11 itself can be made in a smaller size.

In the embodiment, because the springs S1, S2 are made in a double structure, the scanner unit 13 can be supported adequately, thereby making smaller the load exerted to the hinge gh1 (see, FIG. 2). Therefore, the durability of the MFP 11 can be improved.

Although in this embodiment the scanner support unit 40 is disposed at each side of the MFP 11, the unit 40 can be provided at either one side.

Although in this embodiment the first and second springs S1, S2 as the urging members are disposed, urging members in a plural number, e.g., three or more, may be arranged.

In this embodiment, the MFP 11 is described, but this invention is applicable to such as, e.g., printers, photocopiers, and facsimile machines.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. An image forming apparatus comprising:
    an opening closing unit arranged in a manner openable between a first position and a second position with respect to a body unit; and
    an associating mechanism connecting the body unit with the opening closing unit and operating in association with opening and closing of the opening closing unit,
        wherein the associating mechanism includes a plurality of compression springs and a buffer member, urges the opening closing unit with a first compression spring of the plurality of compression springs when the opening closing unit is placed at the first position, urges the opening closing unit with the first compression spring and a second compression spring of the plurality of compression springs when the opening closing unit is placed at a third position between the first position and the second position, and buffers movement of the opening closing unit with the buffer member when the opening closing unit is placed at a fourth position between the second position and the third position,
        wherein the first compression spring, the second compression spring and the buffer member are arranged coaxially, and
        wherein the buffer member includes a cylinder portion, a piston portion disposed movably relatively to the cylinder portion and a fluid contained in the cylinder portion for buffering.

2. The image forming apparatus according to claim 1, wherein the first position is an opening position at which the opening closing unit is open, wherein the second position is a closing position at which the opening closing unit is closed, and wherein the first compression spring is placed between the opening position and the closing position in a normally compressed state.

3. The image forming apparatus according to claim 1, wherein the second spring is arranged on an inner side in a radial direction from the first compression spring, and wherein the buffer member is arranged on an inner side in a radial direction from the second compression spring.

4. The image forming apparatus according to claim 1, wherein a free length of the second compression spring is shorter than a free length of the first compression spring, and wherein a free length of the buffer member is shorter than the free length of the second compression spring.

5. The image forming apparatus according to claim 1, wherein the associating mechanism is extended according to opening of the opening closing unit and is compressed according to closing of the opening closing unit.

6. The image forming apparatus according to claim 1, wherein the associating mechanism includes a first casing provided swingably with respect to the body unit, and a second casing arranged swingably with respect to the opening closing unit and movable with respect to the first casing, and wherein the first and second compression springs and the buffer member are provided in the first and second casings.

7. The image forming apparatus according to claim 6, wherein a first engagement surface is formed in the first casing for engaging one end of the first compression spring, one end of the second compression spring and one end of the buffer member, wherein a second engagement surface is formed in the second casing for engaging an other end of the first compression spring, and wherein a third engagement surface is formed in the second casing for engaging an other end of the second compression spring and an other end of the buffer member.

8. The image forming apparatus according to claim 7, wherein the one end of the first compression spring, the one end of the second compression spring and the one end of the buffer member are always engaged with the first engagement surface.

9. The image forming apparatus according to claim 7, wherein the other end of the first compression spring is always engaged with the second engagement surface, and wherein the other end of the buffer member is engaged with the third engagement surface after the other end of the second compression spring is engaged with the third engagement surface while the opening closing unit is moved from the first position to the second position.

10. The image forming apparatus according to claim 1, wherein the opening closing unit has a first casing and a second casing and an engagement portion formed at the first casing and an engagement portion formed at the second casing are engaged with each other when the opening closing unit is placed at the first position.

11. The image forming apparatus according to claim 1, wherein the opening closing unit is a scanner unit, whereas the body unit is a printer section.

12. The image forming apparatus according to claim 1, wherein the associating mechanism is disposed on both sides of the opening closing unit respectively.

13. The image forming apparatus according to claim 1, wherein the first compression spring urges the opening closing unit with the urging force FS1-1 when the opening closing unit is placed at the first position, and the first compression spring, the second compression spring and the buffer member urge the opening closing unit with the urging forces FS1-4, FS2-4, and FDp-4 when the opening closing unit is placed at the second position.

14. The image forming apparatus according to claim 13, wherein the first compression spring and the second compression spring urge the opening closing unit with the urging forces FS1-2 and FS2-2 when the opening closing unit is placed at the third position, and the first compression spring, the second compression spring and the buffer member urge the opening closing unit with the urging forces FS1-3, FS2-3, and FDp-3 when the opening closing unit is placed at the fourth position, and the following formula are satisfied:

$FS1\text{-}1 < FS1\text{-}2 < FS1\text{-}3 < FS1\text{-}4$; and $FS2\text{-}2 < FS2\text{-}3 < FS2\text{-}4$.

15. An image forming apparatus comprising:
an opening closing unit arranged in a manner openable between a first position and a second position with respect to a body unit; and
an associating mechanism connecting the body unit with the opening closing unit and operating in association with opening and closing of the opening closing unit, wherein the associating mechanism includes a plurality of compression springs and a buffer member, urges the opening closing unit with a first compression spring of the plurality of compression springs when the opening closing unit is placed at the first position, urges the opening closing unit with the first compression spring and a second compression spring of the plurality of compression springs when the opening closing unit is placed at a third position between the first position and the second position, and buffers movement of the opening closing unit with the buffer member when the opening closing unit is placed at a fourth position between the second position and the third position,
wherein the first compression spring and the second compression spring are arranged coaxially,
wherein the associating mechanism includes an inner casing and an outer casing,
where a distance between opposed, inwardly-facing wall surfaces of the inner casing is denoted by $\delta 1$, $\delta 2$,
where a distance between opposed, inwardly-facing wall surfaces of the outer casing is denoted by $\delta 3$, $\delta 4$,
where an outer diameter of the first compression spring is denoted by D1,
where an inner diameter of the first compression spring is denoted by d1,
where an outer diameter of the second compression spring is denoted by D2,
where an inner diameter of the second compression spring is denoted by d2, and
where a maximum diameter of the buffer member is denoted by D3, and the following formula are satisfied:

$D1 < \delta 1 = \delta 2 < \delta 3 = \delta 4$;

$D2 < d1$; and $D3 < d2$.

* * * * *